United States Patent
Lanin et al.

(10) Patent No.: US 9,189,462 B2
(45) Date of Patent: Nov. 17, 2015

(54) BIDIRECTIONAL TEXT CHECKER

(75) Inventors: Aharon Lanin, Efrat (IL); Jason Elbaum, Modiin (IL); Amir Fish, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 691 days.

(21) Appl. No.: 13/286,539

(22) Filed: Nov. 1, 2011

(65) Prior Publication Data

US 2012/0109634 A1    May 3, 2012

Related U.S. Application Data

(60) Provisional application No. 61/409,332, filed on Nov. 2, 2010.

(51) Int. Cl.
  *G06F 17/27* (2006.01)
  *G06F 17/22* (2006.01)
(52) U.S. Cl.
  CPC .................................. *G06F 17/2223* (2013.01)
(58) Field of Classification Search
  CPC ....... G06F 17/28; G06F 8/60; G06F 17/2809; G06F 17/2854; G06F 17/2872; G06F 17/2836; G06F 9/4448; G06F 17/248; G06F 17/2288
  USPC .......................................... 704/2–8; 715/264
  See application file for complete search history.

(56) References Cited

U.S. PATENT DOCUMENTS

| | | | | | |
|---|---|---|---|---|---|
| 5,812,122 | A | * | 9/1998 | Ng | 715/703 |
| 7,086,004 | B2 | * | 8/2006 | Atkin | 715/205 |
| 2002/0143825 | A1 | * | 10/2002 | Feinberg | 707/526 |
| 2003/0023590 | A1 | * | 1/2003 | Atkin | 707/6 |
| 2004/0059998 | A1 | * | 3/2004 | Palmieri | 715/501.1 |
| 2004/0177322 | A1 | * | 9/2004 | Atkin | 715/513 |
| 2005/0172227 | A1 | * | 8/2005 | Feinberg | 715/526 |
| 2006/0106593 | A1 | * | 5/2006 | Schultz et al. | 704/5 |
| 2006/0265649 | A1 | * | 11/2006 | Danilo | 715/542 |
| 2011/0106524 | A1 | * | 5/2011 | Mousaad | 704/8 |
| 2011/0107202 | A1 | * | 5/2011 | El-Shishiny et al. | 715/243 |

OTHER PUBLICATIONS

Alvestrand et al., Alvestrand, Right-to-Left Scripts for Internationalized Domain Names for Applications (IDNA), 2010, tools.ietf.org/html/rfc5893, pp. 1-12.*
Mark Davis, Unicode Bidirectional Algorithm, Unicode Standard Annex #9, 2009, www.unicode.org/reports/trn/trn-21.html, pp. 1-27.*

(Continued)

*Primary Examiner* — Lamont Spooner
(74) *Attorney, Agent, or Firm* — Remarck Law Group PLC

(57) ABSTRACT

Methods and systems for checking bidirectional text in text content, such as in a web page, are provided. A method for checking bidirectional text may include determining intrinsic and declared text directions of text content. The method may also include generating a bidirectional text error based on a mismatch between the intrinsic text direction and the declared text direction. Bidirectional text errors may be reported. A system may include a walker, a bidirectional text checker and a bidirectional error reporter.

36 Claims, 4 Drawing Sheets

(56) References Cited

OTHER PUBLICATIONS

European Patent Office, PCT-Notification of Transmittal of The International Search Report and the Written Opinion of the International Searching Authority, or the Declaration, International Appln. No. PCT/US2011/058804, International Filing Date: Nov. 1, 2011, Mailed Dec. 21, 2011, 11 pages.

Lanin, A., et al., "Additional Requirements for BiDi in HTML",W3C, Mar. 4, 2010, XP002665451, Retrieved from the Internet: URL:http://www.w3.org/TR/2010/WD-html-bidi-20100304/; [retrieved on Dec. 7, 2011].

Davis, M., "Unicode Standard Annex #9—Unicode Bidirectional Algorithm", Unicode Consortium, Sep. 27, 2010, XP002665452, Retrieved from the Internet: URL:http://unicode.org/reports/tr9/ [retrieved on Dec. 7, 2011].

Henderson, C., "Understanding Bidirectional (BIDI) Text in Unicode", Mar. 1, 2009, XP002665453, Retrieved from the Internet: URL:http://www.iamcal.com/understanding-bidirectional-text/ [retrieved on Dec. 7, 2011] the whole document.

Ishida, R., "Authoring HTML: Handling Right-to-left Scripts", Sep. 8, 2009,XP002665454,Retrieved from the Internet: URL:http://www.w3.org/TR/i18n-html-tech-bidi; [retrieved on Dec. 7, 2011] the whole document.

\* cited by examiner

BIDIRECTIONAL TEXT CHECKER

CROSS REFERENCE TO RELATED APPLICATIONS

This application claims the benefit of U.S. Provisional Appl. No. 61/409,332, filed Nov. 2, 2010, which is hereby incorporated by reference in its entirety.

TECHNICAL FIELD

The field relates to text analysis of application documents, including web pages.

BACKGROUND

Text document pages and web pages display content in different languages. Hebrew, Arabic and various other languages are written in right-to-left scripts. It is a common requirement for an application to be localized to one or more of the languages written in these scripts. Applications are also required to be able to display and obtain input text in these languages even when the overall page is localized to a left-to-right language, or vice versa. Furthermore, when displaying or taking as input right-to-left text in an overall page localized to a left-to-right language, or vice versa, the application must explicitly declare the direction of such text, since without such explicit direction declaration, the text may not be displayed correctly These directional requirements are often called bidi support ("bidi" is short for bidirectional). To implement bidi support, an application's pages must use mark-up and/or special formatting characters to declare and control page and text direction.

It can be quite difficult for applications to implement bidi support. In particular, this requires special handling at every point where it displays a data item or allows the user to enter a data item whose direction could potentially be opposite that of the overall page. As a result, an application's bidi support is always in danger of regression, as developers working on a new feature often simply forget to deal with text direction, and thus do not add the required handling in the new feature. Often, applications and pages with bidirectional text present such content with errors.

BRIEF SUMMARY

Embodiments relate to checking for bidirectional text errors in text content, such as content of a web page. Text content may also include any other document or portion of a document. According to an embodiment, a method for checking bidirectional text includes determining an intrinsic text direction of a text part. A text part may be a character, word, sentence or section of text. Text parts may also be identified as user inputs, tool tips (e.g., hover text), or by a change in the declared direction or intrinsic direction of a text. Other text parts may include numbers, dates and text headings. The method further includes determining a declared text direction associated with the text part. The method also includes generating a bidirectional text error based on a mismatch between the intrinsic text direction and the declared text direction. Bidirectional text errors are reported. Text content may be divided into text parts where each text part is checked.

According to another embodiment, a system for checking bidirectional text in text content includes a walker configured to determine an intrinsic text direction and declared text direction of a text part. The system also includes a bidirectional text checker configured to generate a bidirectional text error based on a mismatch between the intrinsic text direction and the declared text direction. The system further includes a bidirectional error reporter configured to report the bidirectional text error.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
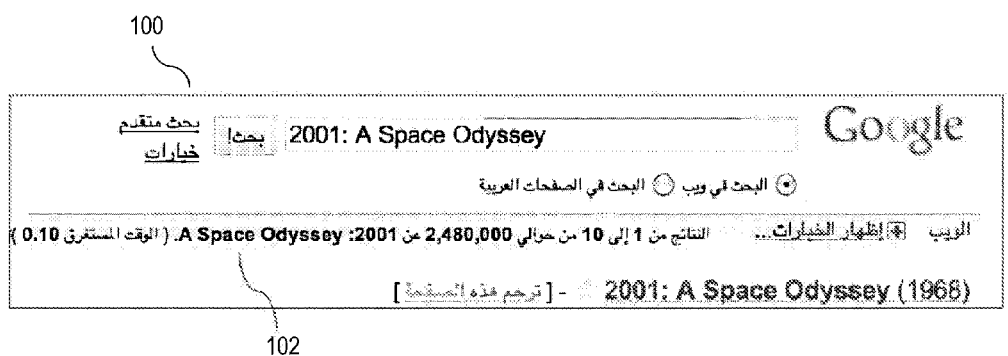
FIG. 1 shows an example web page having bidirectional text.
Figure 2:
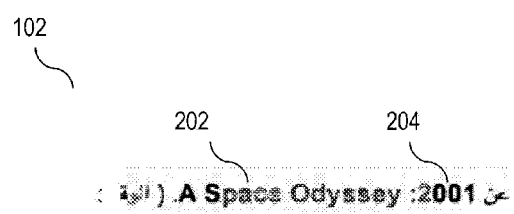
FIG. 2 illustrates an example of an incorrect display of bidirectional text.

It can be quite tricky for applications to present bidirectional text correctly. Declarations of proper text direction may either be incorrect or missing for text parts. As a result, text content involving bidirectional text may be displayed with directional errors. For example, FIG. 1 shows a display view 100 of a search web page that includes text parts in Arabic that are written right-to-left. However, an incorrect display 102 of bidirectional text has occurred. In FIG. 2, text part 102 shows that the "A Space Odyssey" portion 202 precedes the "2001" portion 204, which is incorrect.

The embodiments described below provide for the ability to check bidirectional text for errors in a web page, markup file, XML file, plain text string or other text-containing document format for errors. For example, a web page may be scanned to look for places where directional mark-up or formatting characters are missing or used incorrectly. Bidirectional text errors may be reported so that corrections can be made to properly display web page content.

Figure 3:
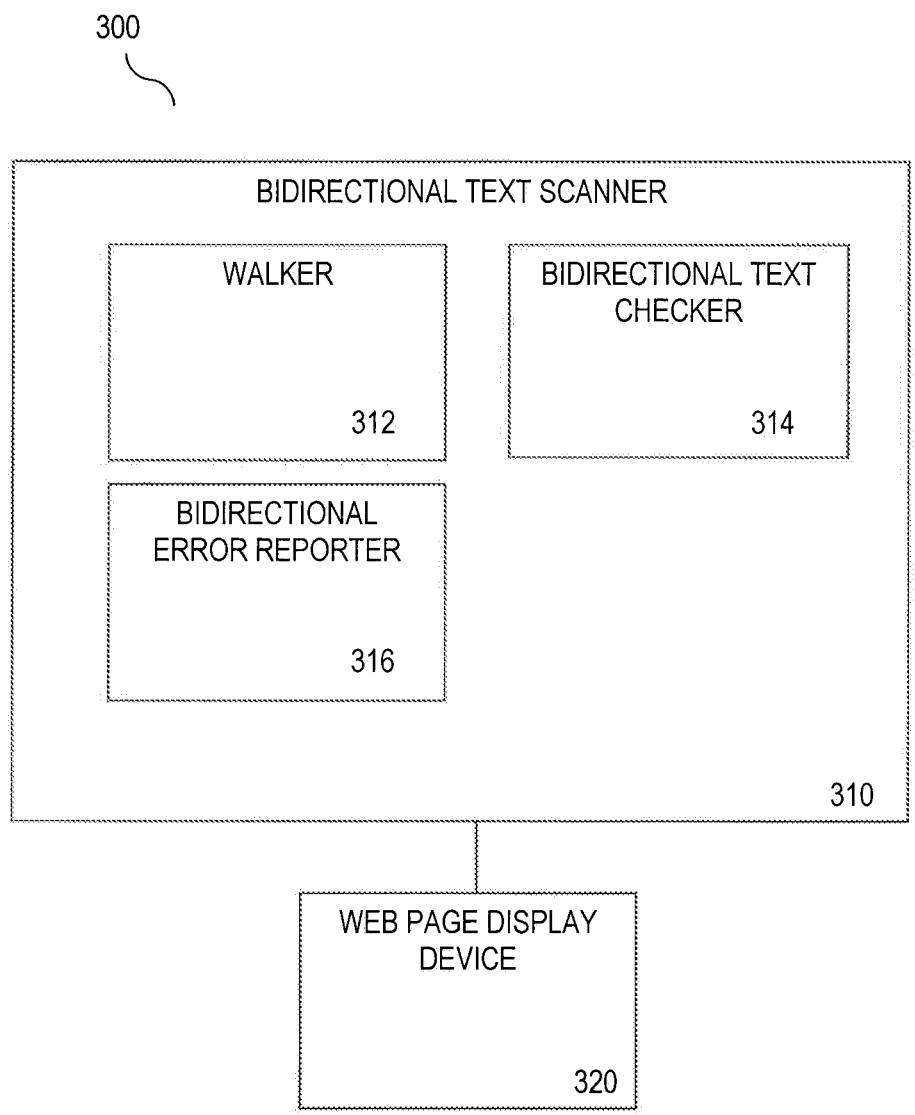
FIG. 3 illustrates an architecture diagram of a system for checking bidirectional text in text content according to an embodiment.

FIG. 3 is an architecture diagram of exemplary bidirectional text checking system 300, according to an embodiment. Bidirectional text checking system 300, or any combination of its components, may be part of or may be implemented with a computing device. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

Bidirectional text checking system 300 may include a bidirectional text scanner 310. In some cases, scanner 310 may be coupled to web page display device 320, which displays or prepares a web page for display. Web pages may be displayed in a web browser. According to an embodiment, scanner 310 includes walker 312, bidirectional text checker 314 and bidirectional error reporter 316.

According to an embodiment, scanner 310 may be configured to scan one or more Document Object Models (DOM) of a web page, including recursively for all its contained frames. A web page can be composed of multiple frames, each of which has its own DOM. A frame can in turn contain other frames, and so on. For purposes of explanation, each use of "DOM" may refer to a DOM of a single page or frame. For each DOM encountered, scanner 310 may activate walker 312 and bidirectional text checker 314. DOM content scanning may be structured internally in an event-driven architecture.

Figure 4:
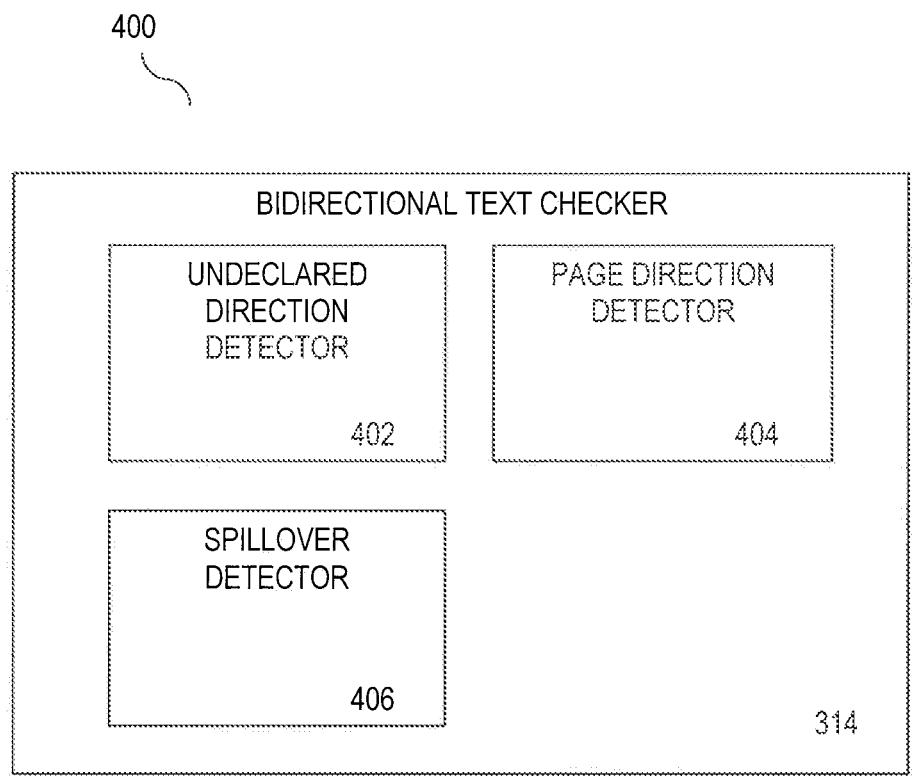
FIG. 4 illustrates an architecture diagram of a bidirectional text checker according to an embodiment.

Walker 312 may be configured to traverse the DOM, translating or summarizing it into a series of events, according to an embodiment. Walker 312 may be configured to summarize the DOM in different ways and execute different types of events. Bidirectional text checker 314 may be configured to include multiple detectors, as shown in FIG. 4. Detectors listen for events of types that are of interest and record aspects they are configured to detect, such as bidirectional errors. Walker 312 may be configured to work with bidirectional text checker 314. Walker 312 may also be configured to operate on each DOM.

According to an embodiment, walker 312 may be configured to traverse a single DOM and dispatch a series of events of the following four types: StartTag when encountering the opening of a markup tag, EndTag when encountering the closing of a markup tag, TextNode when encountering a block of text, and EndOfDom when reaching the end of the DOM. Walker 312 may keep track of the current declared text directionality (left-to-right or right-to-left) of each node in the DOM. Walker 312 may also collect a list of any frames directly contained by the DOM.

Walker 312 may be configured to determine declared text directions, according to an embodiment. The declared text directions may be one of left-to-right ("ltr"), right-to-left ("rtl"), left-to-right override ("lro"), right-to-left override ("rlo"), and "unknown". The override values mean any intrinsic text direction is overridden and declared to be either left-to-right or right-to-left regardless. As such, lro and rlo declarations will not result in mismatch errors, and the walker may in fact not differentiate between lro, rlo, and unknown values. Walker 312 may also be configured to determine declared page direction contexts.

According to a further embodiment, walker 312 may traverse a single DOM, dispatching a series of events representing same-directionality sequences of text (known as DirChunks) in the same block-level element of the DOM. Whenever the declared directionality changes or a new block-level element starts, a new DirChunk is dispatched.

According to an embodiment, system 300 may be configured to divide text content of a document into meaningful text parts and report those parts whose intrinsic text direction conflicts with their declared text direction. The declared directional context indicates the expected direction of the text part. A part of the text can be meaningful either due to the document identifying it as a meaningful unit, or simply due to its intrinsic directional properties. For example, the value of an input element in an HTML document is all one text part identified by the HTML element.

An intrinsic text direction may be determined by identifying a left-to-right direction when a text part character has a Unicode value indicating left-to-right and identifying a right-to-left direction when a text part character has a Unicode value indicating right-to-left. A character is numeric when a Unicode bidi class of the character is EN or AN. A character is neutral when a Unicode bidi class of the character is ES, ET, CS, or ON. A character is whitespace when a Unicode bidi class of the character is WS.

In another example, the text content of a document can be divided into a set of text parts such that said application of the Unicode Bidirectional Algorithm either assigns an even embedding level to all the characters in the text part or an odd embedding level to all the characters in the text part, so that no text part has characters belonging to different paragraphs as defined by the said application of the Algorithm. The text content may be divided into the smallest possible number of text parts such that no text part with a mismatch between the intrinsic text direction and the declared text direction starts or ends with numeric, neutral or whitespace character. Text parts may include:

1. A single LRE, RLE, LRO, RLO, or PDF character.
2. A string none of whose characters is of bidirectional (bidi) class LRE, RLE, LRO, RLO, PDF, R, AL, or L.
3. A string none of whose characters is of bidi class LRE, RLE, LRO, RLO, PDF, R, or AL, and which begins and ends with a character of bidi class L.
4. A string none of whose characters is of bidi class LRE, RLE, LRO, RLO, PDF, or L, and which begins and ends with a character of bidi class R or AL.

In some embodiments, system 300 or walker 312 is configured to divide text content into plurality of text parts. For example, text content may be divided into a plurality of text parts such that in each text part, all the characters of the text part have the same explicit embedding level and override status. In another example, text content is divided into the plurality of text parts such that no text part has characters belonging to different paragraphs as defined by applying the Unicode Bidirectional Algorithm to the content being checked together with any higher level protocols customarily applied to this type of content. The Unicode Bidirectional Algorithm (UBA) is a standard algorithm that includes separating text into paragraphs, initializing directional character types, applying a series of rules to lists of embedding levels and directional character types, and reordering the text for display.

In another example, text content is divided into a plurality of text parts such that no text part has mixed intrinsic text direction unless the text part is a part of the text content that is not expected to contain or cannot reasonably contain embedded direction declarations such as LRE and RLE characters or mark-up indicating direction, such as a text input element in an HTML document.

In a further example, the text content is divided into a plurality of text parts such that the number of text parts is as small as possible without reducing the portion of the text content covered by the text parts.

According to an embodiment, bidirectional text checker 314 may be configured to determine the intrinsic direction of a text string as follows. Any part that starts with an LRE, RLE, LRO, or RLO, ends either with PDF or the end of the string, and contains no LRE, RLE, LRO, RLO, or PDF in between is removed from the string. This removal is repeated on the resulting string as many times as possible. A character belonging to the left-to-right script is determined to be Unicode bidi class L and a character belonging to the right-to-left script is determined to be Unicode bidi class R or AL. For example, a character is determined to belong to a left-to-right script when applying to the text content version 6.0.0 of the Unicode Bidirectional Algorithm together with any higher level protocols customarily applied to this type of content, and in this application completing the rules of the Algorithm up to and including X8, but not the subsequent rules, would assign to the character directional character type L. A character is determined to belong to a right-to-left script when applying to the text content version 6.0.0 of the Unicode Bidirectional Algorithm together with any higher level protocols customarily applied to this type of content, and in this application completing the rules of the Algorithm up to and including X8, but not the subsequent rules, would assign to the character directional character type R or AL. If the result contains no L, R, or AL characters, its direction is "neutral". Punctuation and white spaces are considered neutral. Otherwise, if it contains no L characters, it is "rtl". Otherwise, if it contains no R or AL characters, it is "ltr". Otherwise, it is "mixed" when a right-to-left direction, left-to-right direction or neutral direction are not identified.

According to another embodiment, bidirectional text checker 314 identifies a left-to-right direction when a text part contains at least one character belonging to a left-to-right script but no characters belonging to a right-to-left script. Bidirectional text checker 314 also identifies a right-to-left direction when a text part contains at least one character belonging to a right-to-left script but no characters belonging to a left-to-right script.

According to an embodiment, walker 312 may be configured to determine the declared text direction for any character in the text content of a document for several document types:

For plain text Unicode strings, the declared text direction of a character in the string is determined by the closest LRE, RLE, LRO, and RLO character, if any, before it whose matching PDF character, if any, is after it. If there is no such character, the declared text direction or directional context is "unknown". Otherwise, it is "ltr" for LRE, "rtl" for RLE, "lro" for LRO, and "rlo" for RLO.

For HTML and XML documents, the declared text direction of any character in its text nodes or attributes may determined as follows:
  For a character in an attribute, compute the plain text directional context for the attribute value. If it is unknown, its text direction is unknown or neutral.
  Find the text node's or attribute's declared text direction, as defined below.
  In XML, the declared text direction element is the closest ancestor element that has a dir attribute, or the root element otherwise. The context element's directional context is equal to its dir attribute value, or to "ltr" if it has no dir attribute.
  In HTML, the directional context is the closest ancestor element whose computed "unicode-bidi" style property value is other than "normal". This is usually either a <bdo> element, a block element, or an element with a dir attribute, since the unicode-bidi style property of all these is set by default CSS rules ("override" for <bdo>, and "embed" for the others, although the unicode-bidi style can also be set directly by CSS rules or inline CSS). The context element's directional context is then the element's computed "direction" style property value, which is bumped from "ltr" to "lro" and from "rtl" to "rlo" if the context element's computed "unicode-bidi" style property value is "override". An element's computed "direction" style property is usually either set via the dir attribute or inherited, although it too can be set directly by CSS rules or inline CSS. If the root element does not have the dir attribute and no CSS rule or inline CSS sets its "direction" style property, its computed base direction is "ltr".

For a character in a text node, the plain text directional context may be determined for a text string built by an in-order traversal of the text node descendants of the context element. If it is not "neutral", that is its directional context. Otherwise, the directional context is that of the context element.

According to an embodiment, the declared text direction of a text part is determined to be left-to-right when applying to the text content version 6.0.0 of the Unicode Bidirectional Algorithm together with any higher level protocols customarily applied to this type of content, and in this application completing the rules of the Algorithm up to and including X8, but not the subsequent rules, would assign to the characters of the text part embedding levels the lowest of which is even. The declared text direction of a text part is determined to be right-to-left when applying to the text content version 6.0.0 of the Unicode Bidirectional Algorithm together with any higher level protocols customarily applied to this type of content, and in this application completing the rules of the Algorithm up to and including X8, but not the subsequent rules, would assign to the characters of the text part embedding levels the lowest of which is odd.

Bidirectional text checker 314 may be configured to generate a bidirectional text error based on a mismatch between a text part's intrinsic text direction and its declared text direction. For example, the intrinsic direction and its declared text direction mismatch if one is "ltr" and the other is "rtl". (Thus, "lro", "rlo", "unknown", "neutral", and "mixed" do not conflict with any value.)

According to a further embodiment, a mismatch is not identified when either the intrinsic text direction or the declared direction is not left-to-tight or right-to-left. Also, a mismatch is not identified when the text part is determined to be neutral, mixed, undefined or other.

Bidirectional text checker 314 may be configured to determine a text direction, according to an embodiment. Bidirectional text checker 314 may also be configured to listen to events from walker 312 to identify meaningful parts of text for a particular purpose, such as finding bidirectional errors of a given type, according to an embodiment. In some cases, a detector instance may be used in the context of a particular document (DOM) to be scanned, and is not reused. Therefore, when a page containing frames is scanned, there is a separate detector for each frame, as well as the one for the top-level page.

As illustrated in FIG. 4, bidirectional text checker 314 may include undeclared direction detector 402, page direction detector 404 and spillover detector 406, according to an embodiment. According to an embodiment, undeclared direction detector 402 may be configured to determine undeclared opposite-directionality text errors. Undeclared direction detector 402 may be configured to generate a bidirectional test message, such as a bidirectional text error, based on a comparison between the text direction and the declared text direction. Undeclared direction detector 402 may generate a bidirectional text error when the intrinsic text direction does not match the declared text direction. For example, the intrinsic text direction may be right-to-left while the declared directional context is left-to-right and vice versa.

According to some embodiments, bidirectional text checker 314 or undeclared direction detector 402 may be configured to determine bidirectional text errors based on the following scenarios:

1. A run of intrinsic right-to-left text content characters (other than RLM/RLE/RLO) in a context with a left-to-right, non-override base direction.
2. A run of intrinsic left-to-right text content characters (other than LRM/LRE/LRO) in a context with a right-to-left, non-override base direction.
3. A text <input> with a left-to-right, non-override base direction whose value contains strongly directional right-to-left characters and no strongly directional left-to-right characters. Strongly directional text characters may include letters of the alphabet, which have a fixed direction. Weakly directional text characters may include characters such as numbers, which themselves are left-to-right but do not impart that directionality to their context.
4. A text <input> with a right-to-left, non-override base direction whose value contains strongly or weakly directional left-to-fight characters and no strongly directional right-to-left characters.

Page direction detector 404 may be configured to generate an error if the overall directionality of the root element of the DOM is not as expected, according to an embodiment. For instance, a page text direction declaration may be determined by walker 312. If an expected page direction, as specified by the calling code, is found to be different than a declared page directional context, an error may be generated.

Bidirectional text checker 314 may be configured to determine strongly directional text characters of a text part, according to an embodiment. Bidirectional text checker 314 may be further configured to generate a bidirectional text error when strongly directional text characters of a text element do not match a direction context of the text part.

According to an embodiment, a closing text direction context of the text part associated with the declared text direction may be determined. A numeric text part immediately succeeding the closing text direction context may then be determined. A bidirectional text error may be generated when the closing text direction context precedes the numeric text part. A bidirectional text error may be withheld when an opening text direction context or a block-level element is detected between the closing text direction context and the numeric text part. A bidirectional text error may also be withheld when the closing text direction context does not change the direction of the text direction.

According to another embodiment, spillover detector 406 may be configured to determine a numeric text part that succeeds inline a text part. A declared text direction may declare a direction opposite to the numeric text part's context, with no intervening strongly directional text content. Spillover detector 406 may be configured to detect a text with declared directionality opposite to the surrounding context, followed in-line by a numeric text part without a separate directionality declaration, with nothing but neutrals in between. Spillover detector 406 may be configured to consider a text part as a spillover candidate. For example, when an element with a "dir" attribute closes, and this causes a change in the current directionality, the text part becomes a spillover candidate. If a text part containing a number (with only neutral characters preceding it) is encountered, this may also be a candidate. If spillover detector 406 encounters a text part containing, for example, a strongly directional character, or the opening of an element with a declared text direction context such as an "dir" attribute, or the closing of an element with a "dir" attribute which does not change the current directionality, or the opening or closing of a block-level element, the spillover candidate is withheld or canceled.

Specific details may be associated with a bidirectional text error identified by a detector, such as for example: its structural location on the page, the text on the page where it appears, adjacent text on the page, the error type and an estimate of its level of severity. Severity values may be assigned based on one or more factors, including likelihood of error. For example, if a text part is adjacent to a neutral character such as a punctuation mark, the error could be severe such as a period or exclamation mark on the wrong side of a text part. Errors may be generated by detectors and returned to the caller for handling, and (optionally) displayed on the page using an interactive graphical interface.

In another example, a severity value may be assigned to a bidirectional text error based on whether the text part starts with, ends with, is preceded inline by, or is succeeded inline by a string consisting of one or more numeric or neutral characters. The string may also include whitespace characters.

Scanner 310 may be configured to invoke walker 312 and bidirectional text checker 314. In some cases, scanner 310 may be implemented in a scripting language script, such as JavaScript, which walks through one or more Document Object Models (DOM) of a web page. Bidirectional text checker 314 may be configured to identify constructs which are likely to be manifestations of errors in bidirectional text handling by the web application. Walker 312 may track the current declared directionality of each segment or part of text of a text node in text content, such as on a page. Bidirectional text checker 314 may be configured to check for one or more types of error, including: 1) incorrectly declared overall page directional context, 2) a mismatch between the declared directional context of a piece of text and the actual text direction of the text characters, and 3) opposite-directionality text followed by a number, which typically gives rise to garbled rendering. Text messages, including errors, may be generated and reported by bidirectional error reporter 316 to a user or the component that instructed scanner 310 to search for bidirectional errors.

Scanner 310 may be invoked in various ways. For example, scanner 310 may be invoked directly from a JavaScript-based test suite. Alternatively, scanner 310 may be invoked from a Java-based test suite via a Java integration layer. This allows a caller to navigate to a web page using a library, such as the WebDriver library, in Java and invoke scanner 310 via a Java function call. Internally, the Java code may implant scanner 310 into a web page using the library's JavaScript invocation mechanism. Scanner 310 may be invoked and report the results to the Java AP.

For example, scanner 310 may be called from an automated test suite to check for bidirectional errors before a web page goes live. A sample test for the text elements in FIG. 1 may be implemented as follows:

```
public void testRightToLeftWebSearchHome( ) {
BidiChecker bidiChecker = new BidiChecker( );
WebDriver driver = new Builder( ).build( );
String query = "&q=2001:+A+Space+Odyssey"; // English search string.
driver.get("http://www.google.com/search?hl=ar" + query); // Arabic UI.
BidiChecker.Errors bidiErrors = bidiChecker.checkPage(driver,
BidiChecker.Dir.RTL); // Arabic page should have <body dir="rtl">.
MoreAsserts.assertEmpty(bidiErrors); // No BiDi errors!
}
```

In another embodiment, a command-line tool may be provided which packages the Java API into a command-line executable which accepts a URL, opens a browser, runs scanner 310, and outputs the messages or errors to the console.

Scanner 310 may also be associated with an in-browser GUI which modifies the web page under test to visually highlight the errors in their positions on the page, allowing a user to browse through them one by one or to view them simultaneously. This GUI can be activated via the command-line tool, a scripting language such as JavaScript, or an API such as Java APIs. According to a further embodiment, false positives may be filtered, withheld or suppressed based on properties of the errors.

The detectors may provide an indication of the severity, such as a mismatch value, to which each occurrence is suspicious based on various criteria such as the text content characters in the vicinity of the occurrence, and how "far away" the occurrence's directional context is most immediately declared. For example, criteria may include whether a block element intervenes on the path between the occurrence's location and the ancestor on which its direction is declared.

Reporter 316 may provide a mechanism to disregard those suspicious occurrences that meet a specification based on their various properties, such as the degree to which they are suspicious, their text content, and the properties of the element in which they occur, including its location in the page. This is useful for filtering out false positives that do not represent real problems, as well as known bugs.

Scanner 310 may offer a feature to modify the page being tested in order to display the suspicious occurrences directly in the page, according to an embodiment. Scanner 310 may be implemented by scanning a page's DOM as exposed by the browser. Scanner 310 may also be implemented in a script running in the browser. The script can be external to the web page but then can be inserted into the web page. This can make use of the browser's infrastructure for determining declared text directions. Scanner 310 can have component(s) for use with specific automated webapp testing frameworks, providing the capability to easily inject the script implementing the DOM scan into the browser page, execute it, and retrieve the results.

Scanner 310 may be packaged as a stand-alone command-line utility that scans the page at a given URL. In some cases, a command-line application may output errors to the terminal, along with an in-browser GUI that highlights the locations of the errors on the page itself.

Figure 5:
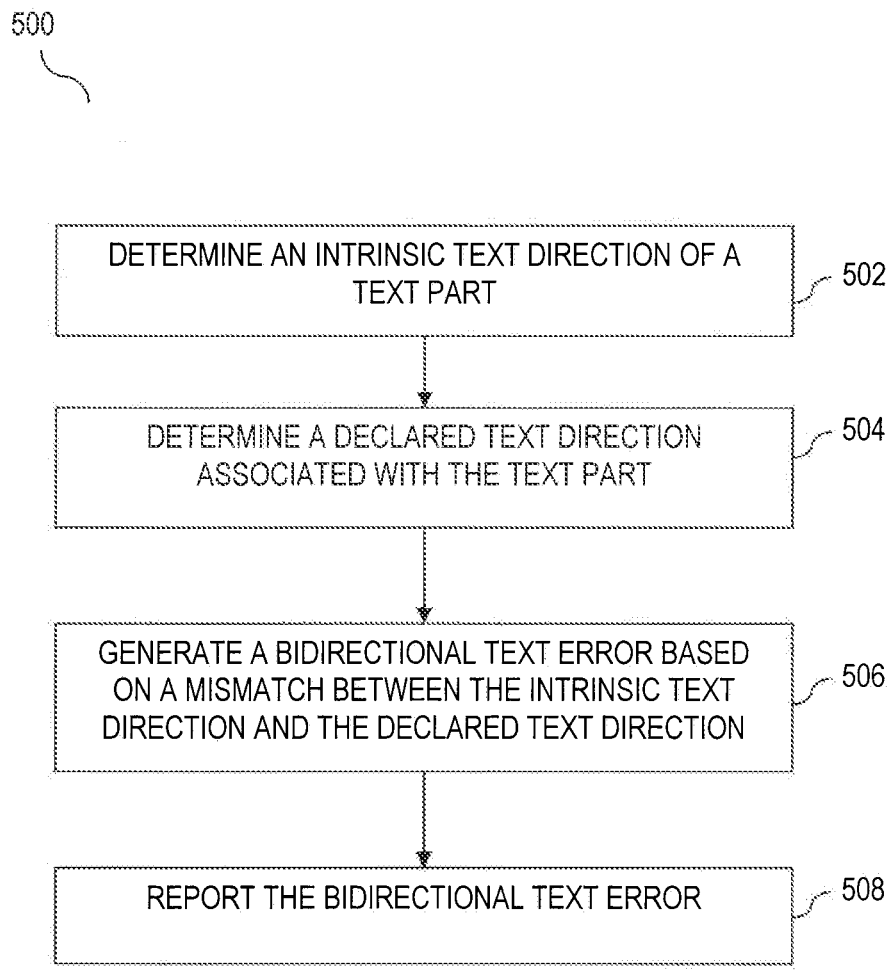
FIG. 5 is a flowchart illustrating a method for checking bidirectional text in text content according to an embodiment.

FIG. 5 is a flowchart of exemplary method 500 for checking bidirectional text in text content, according to an embodiment. Text content can include all or a portion of the content of a document or web page. While method 500 is described with respect to an embodiment of the present invention, method 500 is not meant to be limiting and may be used in other applications. In an example, method 500 may be used to check bidirectional text in text content using scanner 310 of FIG. 3. However, method 500 is not meant to be limited to scanner 310. As shown in FIG. 5, exemplary method 500 begins at step 502 where an intrinsic text direction of a text part of text content is determined. This step may be performed, for example, by bidirectional text checker 314. At step 504, a declared text direction associated with the text part is determined. This may be performed, for example, by walker 312. In some cases, step 504 may be performed before step 502.

At step 506, a bidirectional text error is generated based on a mismatch between the intrinsic text direction and the declared text direction. For example, a bidirectional error may be generated if the intrinsic text direction does not match the declared text direction. For example, an intrinsically right-to-left text part may not match the declared text direction of left-to-right or vice versa. Neutral or mixed text parts may not be considered to be mismatches. In some cases, no declared direction context or indicator may exist. Such text parts inherit the text direction of its parent element or that of the web page.

At step 508, a bidirectional text error is reported. This may be performed by reporter 316. Errors may be emphasized or highlighted in their respective positions. Errors may also be selected or not selected for reporting based on error types. In some cases, only bidirectional text errors having a certain set of error properties may be reported. Such properties may include error location or error severity. Steps 502-508 may be implemented as software, hardware, firmware, or any combination thereof.

According to another embodiment, walker 312 divides the text content into plurality of text parts before step 502. In some cases, text content is divided into a plurality of text parts such that for each text part, an application of the Unicode Bidirectional Algorithm up to and including rule X8 either assigns an even embedding level to all the characters in the text part or an odd embedding level to all the characters in the text part. Steps 502-508 are performed for each of the text parts.

Instead of implementing scanner 310 in JavaScript, it may be implemented in some other programming language integrated into the browser's DOM, or it may be implemented to scan the source of a web page (HTML files, etc.) in any programming language, according to other embodiments. Scanning the source would be somewhat limited, however, as it may not interoperate well with dynamic web pages (AJAX). JavaScript may also be used to export the DOM of a dynamic web page to a textual format to be scanned for errors by some other software system.

Implementing scanner 310 in JavaScript allows it to be invoked easily from any web browser without need of integration with any additional modules. Providing optional APIs for Java/WebDriver or other systems facilitates the integration of scanner 310 into software test suites already using those platforms. Scanner 310, or walker 312, bidirectional text checker 314 or bidirectional error reporter 316, may be called from an external scripting language script, such as JavaScript, inserted into a web page containing the text content to be checked.

In some cases, scanner 310 may be provided as an online service, with a user submitting a URL to be scanned. In other cases, scanner 310 may be packaged as a browser extension to be invoked interactively from the browser. In some embodiments, there may be other algorithms for identifying bidirectional text errors on the page. For example, instead of breaking the text into segments by their declared directionality, scanner 310 may generate a separate index of the character positions where the directionality changes and use that to look up the directionality at any given position. There may be various ways to design a useful in-browser GUI or filtering mechanism for the error reports.

Aspects of the embodiments for exemplary systems 300 and 400 and/or method 500 or any part(s) or function(s) thereof may be implemented using hardware, software modules, firmware, tangible computer readable or computer usable storage media having instructions stored thereon, or a combination thereof and may be implemented in one or more computer systems or other processing systems. Examples of computer-useable media include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Computer instructions are executed using one or more processors and can be stored in non-volatile storage medium or memory devices. Non-volatile storage may include one or more of a hard disk drive, flash memory, and like devices that may store computer program instructions and data on computer-readable media. One or more non-volatile storage devices may be a removable storage device. Memory devices may include one or more volatile memory devices such as but not limited to, random access memory.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for checking bidirectional text in text content, comprising:
   for each text part of a plurality of text parts in the text content:
      determining an intrinsic text direction of the text part, wherein the intrinsic text direction of the text part is determined to be: (i) left-to-right when the text part has a Unicode value indicating left-to-right, and (ii) right-to-left when the text part has a Unicode value indicating right-to-left;
      determining a declared text direction associated with the text part, wherein determining the declared text direction includes:
         applying a Unicode Bidirectional Algorithm to the text part, and
         noting a lowest explicit embedding level assigned by the Unicode Bidirectional Algorithm to any character of the text part and whether the Unicode Bidirectional Algorithm assigned a neutral override status to any of the characters with that lowest explicit embedding level,
         wherein the declared direction is left-to-right when that lowest explicit embedding level was even and had a neutral override status, and the declared direction is right-to-left when that lowest override status was odd and had a neutral override status, and otherwise declaring the declared as undefined;
      generating, with a computing device, a bidirectional text error based on a mismatch between the intrinsic text direction and the declared text direction; and
      reporting the bidirectional text error.

2. The method of claim 1, further comprising dividing the text content into the plurality of text parts.

3. The method of claim 1, wherein determining an intrinsic text direction comprises:
   identifying a left-to-right direction when a text part contains at least one character belonging to a left-to-right script but no characters belonging to a right-to-left script; and
   identifying a right-to-left direction when a text part contains at least one character belonging to a right-to-left script but no characters belonging to a left-to-right script.

4. The method of claim 3, wherein determining an intrinsic text direction further comprising identifying a neutral direction when a text part contains neither left-to-right nor right-to-left script characters.

5. The method of claim 4, wherein determining an intrinsic direction further includes identifying a mixed direction when a right-to-left direction, left-to-right direction or neutral direction is not identified.

6. The method of claim 3, wherein a character is determined to belong to a left-to-right script when the character is determined to be Unicode bidi class L and a character is determined to belong to a right-to-left script when the character is determined to be Unicode bidi class R or AL.

7. The method of claim 1, wherein generating a bidirectional text error includes identifying a mismatch when the intrinsic text direction is left-to-right and the declared text direction is right-to-left or when the intrinsic text direction is right-to-left and the declared text direction is left-to-right.

8. The method of claim 7, wherein a mismatch is not identified when either the intrinsic text direction or the declared direction is at least one of neutral, mixed, undefined or other than left-to-right or right-to-left.

9. The method of claim 1, further comprising dividing the text content into the plurality of the text parts such that in each text part, all the characters of the text part have the same explicit embedding level and override status.

10. The method of claim 9, further comprising dividing the text content into the plurality of text parts such that no text part has characters belonging to different paragraphs as defined by applying the Unicode Bidirectional Algorithm to the text content with higher level protocols corresponding to this type of content.

11. The method of claim 10, further comprising dividing the text content into the plurality of text parts such that no text part has mixed intrinsic text direction unless the text part is a part of the text content that is not expected to contain embedded direction declarations such as LRE and RLE characters or mark-up indicating direction.

12. The method of claim 1, further comprising dividing the text content into the plurality of text parts such that the number of text parts is as small as possible without reducing the portion of the text content covered by the text parts.

13. The method of claim 12, wherein the number of text parts that start or end with numeric, neutral or whitespace characters and have a mismatch between the intrinsic text direction and the declared text direction is as small as possible without reducing the portion of the text content covered by the plurality of text parts.

14. The method of claim 1, wherein reporting includes reporting bidirectional text errors having a set of error properties.

15. The method of claim 14, wherein reporting includes assigning a severity value to the bidirectional text error when one of the following applies:
 (a) the text part starts with or ends with a string consisting of one or more numeric or neutral characters and zero or more whitespace characters;
 (b) the text part is preceded by a text part belonging to the same paragraph and having the same explicit embedding level and override status as defined by the Unicode Bidirectional Algorithm, where the preceding text part ends with a string consisting of one or more numeric or neutral characters and zero or more whitespace characters; or
 (c) the text part is followed by a text part belonging to the same paragraph and having the same explicit embedding level and override status as defined by the Unicode Bidirectional Algorithm, where the following text part begins with a string consisting of one or more numeric or neutral characters and zero or more whitespace characters.

16. The method of claim 1, wherein reporting includes highlighting text parts having bidirectional text errors.

17. The method of claim 1, further comprising:
 calling the determining steps from an external scripting language script inserted into a web page containing the text content to be checked.

18. A system for checking bidirectional text in text content, comprising:
 a walker configured to:
  determine, for each text part of a plurality of text parts in the text content, an intrinsic text direction of the text part, wherein the intrinsic text direction of the text part is determined to be: (i) left-to-right when the text part has a Unicode value indicating left-to-right, and (ii) right-to-left when the text part has a Unicode value indicating right-to-left;
  determine a declared text direction of the text part, wherein determining the declared text direction includes:
   applying a Unicode Bidirectional Algorithm to the text part, and
   noting a lowest explicit embedding level assigned by the Unicode Bidirectional Algorithm to any character of the text part and whether the Unicode Bidirectional Algorithm assigned a neutral override status to any of the characters with that lowest explicit embedding level,
   wherein the declared direction is left-to-right when that lowest explicit embedding level was even and had a neutral override status, and the declared direction is right-to-left when that lowest override status was odd and had a neutral override status, and otherwise declaring the declared as undefined;
 a bidirectional text checker, implemented with a computing device, configured to generate a bidirectional text error based on a mismatch between the intrinsic text direction and the declared text direction; and
 a bidirectional error reporter configured to report the bidirectional text error.

19. The system of claim 18, wherein the walker is further configured to divide the text content into the plurality of text parts.

20. The system of claim 18, wherein the walker is further configured to:
 identify a left-to-right direction when a text part contains at least one character belonging to a left-to-right script but no characters belonging to a right-to-left script; and
 identify a right-to-left direction when a text part contains at least one character belonging to a right-to-left script but no characters belonging to a left-to-right script.

21. The system of claim 20, wherein the walker is further configured to identify a neutral direction when a text part contains neither left-to-right nor right-to-left script characters.

22. The system of claim 21, wherein the walker is further configured to identify a mixed direction when a right-to-left direction, left-to-right direction or neutral direction is not identified.

23. The system of claim 20, wherein a character is determined to belong to a left-to-right script when the character is determined to be Unicode bidi class L and a character is determined to belong to a right-to-left script when the character is determined to be Unicode bidi class R or AL.

24. The system of claim 20, wherein the bidirectional text checker is further configured to identify a mismatch when the intrinsic text direction is left-to-right and the declared text direction is right-to-left or when the intrinsic text direction is right-to-left and the declared text direction is left-to-right.

25. The system of claim 24, wherein a mismatch is not identified when either the intrinsic text direction or the declared direction is at least one of neutral, mixed, undefined or other than left-to-right or right-to-left.

26. The system of claim 18, wherein the walker is further configured to divide the text content into of the plurality of the text parts such that in each text part, all the characters of the text part have the same explicit embedding level and override status.

27. The system of claim 26, wherein the walker is further configured to divide the text content into the plurality of text parts such that no text part has characters belonging to different paragraphs as defined by applying the Unicode Bidirectional Algorithm to the text part with any higher level protocols corresponding to this type of content.

28. The system of claim 18, wherein the walker is further configured to divide the text content into the plurality of text parts such that no text part has mixed intrinsic text direction unless the text part is a part of the text content that is not expected to contain embedded direction declarations such as LRE and RLE characters or mark-up indicating direction.

29. The system of claim 18, wherein the walker is further configured to divide the text content into the plurality of text parts such that the number of text parts is as small as possible without reducing the portion of the text content covered by the text parts.

30. The system of claim 18, wherein the number of text parts that start or end with numeric, neutral or whitespace characters and have a mismatch between the intrinsic text direction and the declared text direction is as small as possible without reducing the portion of the text content covered by the plurality of text parts.

31. The system of claim 18, wherein the bidirectional error reporter is further configured to report bidirectional text errors having a set of error properties.

32. The system of claim 31, wherein the bidirectional error reporter is further configured to report a bidirectional text error by assigning a severity value to the bidirectional text error when one of the following applies:
 (a) the text part starts with or ends with a string consisting of one or more numeric or neutral characters and zero or more whitespace characters;
 (b) the text part is preceded by a text part belonging to the same paragraph and having the same explicit embedding level and override status as defined by the Unicode Bidirectional Algorithm, where the preceding text part ends with a string consisting of one or more numeric or neutral characters and zero or more whitespace characters; or (c) the text part is followed by a text part belonging to the same paragraph and having the same explicit embedding level and override status as defined by the Unicode Bidirectional Algorithm, where the following text part begins with a string consisting of one or more numeric or neutral characters and zero or more whitespace characters.

33. The system of claim 18, wherein the bidirectional error reporter is further configured to highlight text parts having bidirectional text errors.

34. The system of claim 18, wherein the walker is further configured to call the determining steps from an external scripting language script inserted into a web page containing the text content to be checked.

35. A computer-implemented method for checking bidirectional text in text content, comprising:
   determining an intrinsic text direction of a text part, wherein the intrinsic text direction of the text part is determined to be: (i) left-to-right when the text part has a Unicode value indicating left-to-right, and (ii) right-to-left when the text part has a Unicode value indicating right-to-left;
   determining a declared text direction associated with the text part, wherein determining the declared text direction includes:
      applying a Unicode Bidirectional Algorithm to the text part, and
      noting a lowest explicit embedding level assigned by the Unicode Bidirectional Algorithm to any character of the text part and whether the Unicode Bidirectional Algorithm assigned a neutral override status to any of the characters with that lowest explicit embedding level,
      wherein the declared direction is left-to-right when that lowest explicit embedding level was even and had a neutral override status, and the declared direction is right-to-left when that lowest override status was odd and had a neutral override status, and otherwise declaring the declared as undefined;
   generating, with a computing device, a bidirectional text error based on a mismatch between the intrinsic text direction and the declared text direction; and
   reporting the bidirectional text error.

36. A non-transitory computer readable storage medium having control logic stored therein that, when executed by a process, causes the processor to check bidirectional text in text content, the control logic comprising:
   a first computer readable program code to cause the processor to:
   determine, for each text part of a plurality of text parts in the text content, an intrinsic text direction of the text part, wherein the intrinsic text direction of the text part is determined to be: (i) left-to-right when the text part has a Unicode value indicating left-to-right, and (ii) right-to-left when the text part has a Unicode value indicating right-to-left;
   determine a declared text direction of the text part, wherein determining the declared text direction includes:
      applying a Unicode Bidirectional Algorithm to the text part, and
      noting a lowest explicit embedding level assigned by the Unicode Bidirectional Algorithm to any character of the text part and whether the Unicode Bidirectional Algorithm assigned a neutral override status to any of the characters with that lowest explicit embedding level,
      wherein the declared direction is left-to-right when that lowest explicit embedding level was even and had a neutral override status, and the declared direction is right-to-left when that lowest override status was odd and had a neutral override status, and otherwise declaring the declared as undefined;
   a second computer readable program code to cause the processor to generate a bidirectional text error based on a mismatch between the intrinsic text direction and the declared text direction; and
   a third computer readable program code to cause the processor to report the bidirectional text error.

* * * * *